United States Patent
Iisaka et al.

(10) Patent No.: US 10,630,194 B2
(45) Date of Patent: Apr. 21, 2020

(54) POWER CONVERSION DEVICE

(71) Applicant: Panasonic Intellectual Property Management Co., Ltd., Osaka (JP)

(72) Inventors: Atsushi Iisaka, Kanagawa (JP); Tetsuya Ishiguro, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 294 days.

(21) Appl. No.: 15/549,115

(22) PCT Filed: Feb. 17, 2016

(86) PCT No.: PCT/JP2016/000821
§ 371 (c)(1),
(2) Date: Aug. 4, 2017

(87) PCT Pub. No.: WO2016/132739
PCT Pub. Date: Aug. 25, 2016

(65) Prior Publication Data
US 2018/0026546 A1    Jan. 25, 2018

(30) Foreign Application Priority Data
Feb. 20, 2015 (JP) ................. 2015-031682

(51) Int. Cl.
*H02M 7/12* (2006.01)
*H02M 3/28* (2006.01)
(Continued)

(52) U.S. Cl.
CPC ............... *H02M 7/12* (2013.01); *H02J 7/06* (2013.01); *H02M 1/32* (2013.01); *H02M 3/28* (2013.01); *H02J 2007/10* (2013.01)

(58) Field of Classification Search
CPC ..................................................... H02M 7/12
(Continued)

(56) References Cited

U.S. PATENT DOCUMENTS 7,719,808 B2 *  5/2010  Phadke ............... H02H 7/1203
                                                    361/79
2010/0295375 A1 * 11/2010 Oshida .................. B60L 3/003
                                                    307/66
(Continued)

FOREIGN PATENT DOCUMENTS

JP       5-227750 A     9/1993
JP       5-276690 A    10/1993
(Continued)

OTHER PUBLICATIONS

International Search Report of PCT application No. PCT/JP2016/000821 dated Apr. 19, 2016.
(Continued)

*Primary Examiner* — Jerry D Robbins
(74) *Attorney, Agent, or Firm* — Seed IP Law Group LLP

(57) ABSTRACT

A power conversion device includes an input current sensor, an input voltage sensor, a power converter, an output voltage sensor for detecting an output voltage from the power converter, an output current sensor for detecting an output current value from the power converter, and a controller for controlling the power converter. The controller obtains an allowable current value that can be accepted from an external alternating current power source, and, controls the power converter so that the input current value does not exceed the allowable current value based on an input current value detected by the input current sensor. The controller detects an abnormality in the power conversion device based on the input current value, the input voltage, the output current value, the output voltage, and power conversion efficiency of the power converter.

8 Claims, 4 Drawing Sheets

(51) Int. Cl.
*H02M 1/32* (2007.01)
*H02J 7/06* (2006.01)
*H02J 7/10* (2006.01)

(58) Field of Classification Search
USPC .......................................................... 320/140
See application file for complete search history.

(56) References Cited

U.S. PATENT DOCUMENTS

2011/0285350 A1* 11/2011 Mitsutani ................. B60L 58/20
320/109
2013/0088198 A1* 4/2013 Masuda .................. H02J 7/041
320/109
2014/0239894 A1* 8/2014 Mitsutani .................. H02J 7/04
320/109

FOREIGN PATENT DOCUMENTS

| JP | 2000-115998 A | 4/2000 |
| JP | 2013-038917 A | 2/2013 |
| JP | 2013-165610 A | 8/2013 |

OTHER PUBLICATIONS

Notice of Reasons for Refusal in Japan dated Nov. 26, 2019 for the related Japanese Patent Application No. 2017-500524.

* cited by examiner

POWER CONVERSION DEVICE

CROSS-REFERENCE TO RELATED APPLICATION

This application is a U.S. national stage application of the PCT International Application No. PCT/JP2016/000821 filed on Feb. 17, 2016, which claims the benefit of foreign priority of Japanese patent application No. 2015-031682 filed on Feb. 20, 2015, the contents all of which are incorporated herein by reference.

BACKGROUND

Technical Field

The present invention relates to a power conversion device for converting alternating current power into direct current power.

Description of the Related Art

Recently, electrically driven vehicles such as electric vehicles (EVs) and plug-in hybrid vehicles (PHEVs) are prevailing. An electrically driven vehicle obtains a driving force by rotating a motor with power stored in a rechargeable battery. For its operation, the battery needs to be charged.

Methods of charging a battery for an electrically driven vehicle include, for example, a charging method by converting an alternating current supplied from an alternating current power source such as a commercially-available, home-use power source into a direct current, and a direct charging method using a direct current supplied from a direct current power source such as a charging station. The former method is widely referred to as normal charging, while the latter is widely referred to as quick charging. In the quick charging, power is charged to approximately 80% of a full charge in approximately 30 minutes, while, in the normal charging, an EV, for example, is fully charged for a minimum of eight hours at a lower output than an output of the quick charging in general.

For the normal charging for an electrically driven vehicle, a standard system specified by the Society of Automotive Engineers (SAE) in the USA is used. For the normal charging based on the standard system, a charging cable conforming to a standard of SAE J1772 is used. The charging cable is specified with an allowable current value (rated current). Information on the allowable current value is sent, via a pulse signal that is also referred to as a control pilot signal, to a power conversion device (on-vehicle charging device) mounted to a vehicle.

During charging, the power conversion device controls an output value so that a value equal to or above a maximum output value is not output to a battery being charged for a safety purpose. This maximum output value is calculated by multiplying the allowable current value, a value of input voltage to be input into the power conversion device, and conversion efficiency used when converting an input alternating current into a direct current. Since the conversion efficiency varies due to an ambient temperature, input current and voltage, and other factors, the conversion efficiency used when calculating the maximum output value is set to a minimum value of expected conversion efficiency, for example.

The power conversion device controls output power so that the output power does not exceed the maximum output value calculated as described above. As described above, since the maximum output value is calculated based on the expected minimum conversion efficiency, even if the conversion efficiency lowers during charging, an input current value being input into the power conversion device does not exceed the allowable current value. When the conversion efficiency is low, the power conversion device can accept the input current value near the allowable current value. On the other hand, since the maximum output value is calculated based on the expected minimum conversion efficiency, if the conversion efficiency is high, the power conversion device is only able to accept a current value smaller than a value near the allowable current value.

A possible technology to solve such an event is, for example, to allow the power conversion device to directly monitor an input current from a charging facility via the charging cable to perform a feedback control so that the input current does not exceed the allowable current value. Therefore, an input current near the allowable current value can always be accepted, output power can be increased, and a charging period can be shortened.

In a method of controlling output power so that the output power does not exceed the maximum output value, the power conversion device controls the output power so that the output power does not exceed the maximum output value based on the allowable current value. Therefore, even when an abnormality arises in an input current sensor for monitoring an input current value, an excessive current exceeding the allowable current value does not flow into the charging cable. However, in a method of performing, without setting the maximum output value, a feedback control so that an input current does not exceed the allowable current value, if an abnormality arises due to some reasons in the input current sensor for monitoring an input current value, the power conversion device would be likely to accept an input current exceeding the allowable current value. In this case, the excessive current exceeding the allowable current value would be likely to flow into the charging cable, and thus the charging cable would be heated. Such an event would occur in particular when the input current sensor detects a current value that is smaller than an actual input current value.

In view of the above described problems, PTL 1 discloses a technology for diagnosing a fault in a power conversion device. In other words, PTL 1 discloses a fault diagnosis device that calculates an estimated value of output power by multiplying power conversion efficiency in accordance with an operating mode and a total of input power values, compares the measured output power and the estimated value, and determines an abnormality when a difference arises.

CITATION LIST

Patent Literature

PTL 1: Unexamined Japanese Patent Publication No. 2013-38917

BRIEF SUMMARY

The present invention is a power conversion device capable of always accepting an input current near an allowable current value to shorten a charging period, and of preventing an excessive current exceeding the allowable current value from flowing into a charging cable by appropriately diagnosing an abnormality.

The power conversion device according to the present invention converts alternating current power into direct current power, and supplies the direct current power to a load. The power conversion device includes an input current sensor, an input voltage sensor, a power converter, an output current sensor, an output voltage sensor, and a controller. The input current sensor detects an input current value of the alternating current power, and the input voltage sensor detects an input voltage value of the alternating current power. The power converter converts the alternating current power into the direct current power. The output current sensor detects an output current value from the power converter, and the output voltage sensor detects an output voltage value from the power converter. The controller obtains an allowable current value of the alternating current power that can be accepted, and, controls the power converter so that the input current value does not exceed the allowable current value based on the input current value detected by the input current sensor. The controller detects an abnormality in the power conversion device based on the input current value, the input voltage value, the output current value, the output voltage value, and power conversion efficiency of the power converter.

According to this configuration, while shortening a charging period, the excessive current exceeding the allowable current value can be prevented from flowing into the charging cable by appropriately diagnosing an abnormality.

DETAILED DESCRIPTION

Prior to describing an exemplary embodiment of the present invention, problems found in a conventional power conversion device will now briefly be described herein. The fault diagnosis device disclosed in PTL 1 intends to perform a fault diagnosis in a power conversion device, but does not intend to find an abnormality in an input current sensor.

The fault diagnosis device is not a power conversion device for performing a control so that an input current from a charging facility via a charging cable does not exceed an allowable current value. Therefore, a problem where an abnormality arises in the input current sensor and accordingly an excessive current flows into the charging cable cannot occur.

Figure 1:
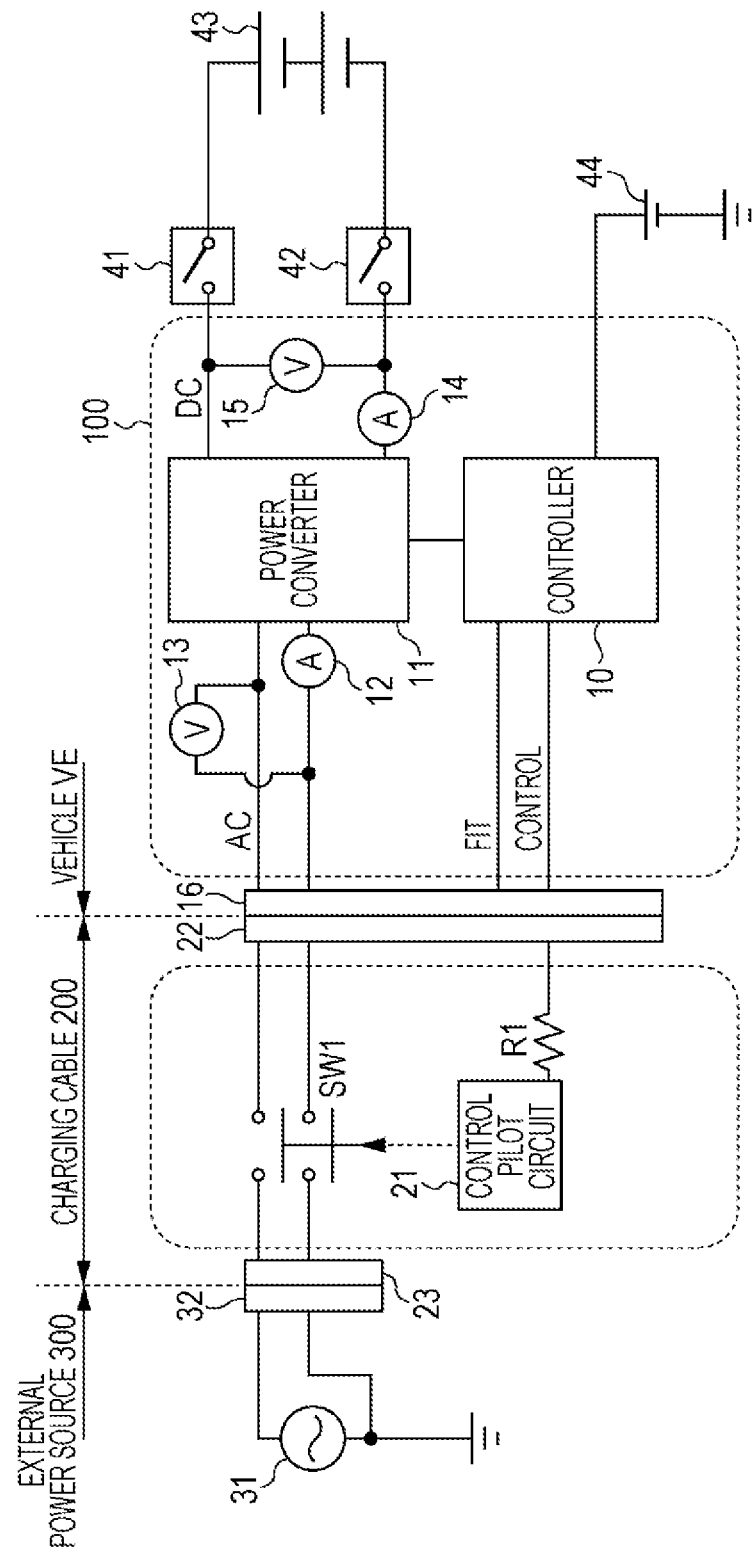
FIG. 1 is a view illustrating a configuration example of an on-vehicle charging device according to an exemplary embodiment of the present invention.

Hereinafter, the exemplary embodiment of the present invention will be described in detail. FIG. 1 is a view illustrating a configuration example of on-vehicle charging device 100 according to the exemplary embodiment of the present invention.

On-vehicle charging device 100 is mounted to vehicle VE, and includes controller 10, power converter 11, input current sensor 12, input voltage sensor 13, output current sensor 14, output voltage sensor 15, and connector 16. In addition to on-vehicle charging device 100, as shown in FIG. 1, vehicle VE is also mounted with main relays 41, 42, high voltage battery 43, and low voltage battery 44. On-vehicle charging device 100 is connected to external power source 300 via charging cable 200, and converts alternating current power supplied from external power source 300 into direct current power to charge high voltage battery 43.

[Description of Components of On-Vehicle Charging Device 100]

Controller 10 receives, together with the alternating current power, a control pilot signal (hereinafter referred to as a pilot signal) that is a pulse signal sent (supplied) from charging cable 200 described later, controls, based on this signal, operations of components of on-vehicle charging device 100 described below, and charges high voltage battery 43. Controller 10 is formed of a microcontroller, for example. Controller 10 operates with power supplied from low voltage battery 44.

Controller 10 includes a resistance circuit (not shown), handles a potential (peak value) of the pilot signal sent via charging cable 200 using the resistance circuit, thereby remotely controls pilot circuit 21 of charging cable 200. Details of remote-controlling of control pilot circuit 21 performed by controller 10 will be described later.

Based on a control performed by controller 10, power converter 11 performs a power conversion operation for converting alternating current (AC) power supplied from external power source 300 via charging cable 200 into direct current (DC) power. Power converter 11 also transforms, as required, the direct current power converted through the power conversion operation to have a voltage appropriate for charging high voltage battery 43. Specifically, power converter 11 can be formed of an AC/DC converter having a power factor improvement circuit, and an insulation type DC/DC converter. Controller 10 controls switching elements included in the AC/DC converter and the DC/DC converter to perform the power conversion operation to convert the alternating current power into appropriate direct current power.

Input current sensor 12 measures current value AC_I of the alternating current power supplied from external power source 300 via charging cable 200.

Input voltage sensor 13 measures voltage value AC_V of the alternating current power supplied from external power source 300 via charging cable 200.

Output current sensor 14 measures current value DC_I of direct current power converted by and output from power converter 11.

Output voltage sensor 15 measures voltage value DC_V of the direct current power converted by and output from power converter 11.

Connector 16 is provided to on-vehicle charging device 100, and is configured to be able to fit with connector 22 of charging cable 200. When connector 16 is fitted to connector 22 of charging cable 200, connector 16 outputs to controller 10 a fitting signal indicating the fitting.

Other components mounted to vehicle VE will now also be described herein. Main relays 41, 42 are switches that is opened and closed based on a control performed by controller 10, and turn on/off supplying of the direct current power converted by power converter 11 in accordance with turning on/off through the control. Main relays 41, 42 may be turned on/off by a vehicle controller (not shown) for wholly controlling vehicle VE.

High voltage battery 43 is a battery for storing power for driving a motor (not shown) mounted to vehicle VE, and is charged with the direct current power output from power converter 11 described above. High voltage battery 43 serves a high voltage (e.g., in a range from 300 V to 500 V) because of connecting a plurality of lithium-ion batteries in series, for example.

Low voltage battery 44 is a battery for operating controller 10 described above and other components mounted to vehicle VE.

In the present exemplary embodiment, main relays 41, 42, high voltage battery 43, and low voltage battery 44 are illustrated as separate components from on-vehicle charging device 100. However, one of the components or some of the components may be included in on-vehicle charging device 100.

[Charging Cable 200]

Charging cable 200 is a cable for connecting on-vehicle charging device 100 of vehicle VE and external power source 300. Charging cable 200 conforms to SAE J1772 standard, for example. Charging cable 200 includes control pilot circuit 21, connectors 22, 23, and switch SW1.

When charging cable 200 is connected to on-vehicle charging device 100 and external power source 300, and is supplied with power from external power source 300, control pilot circuit 21 outputs a pulse signal referred to as a pilot signal to on-vehicle charging device 100. The pilot signal is a pulse signal oscillating at a predetermined frequency. A duty ratio of the pulse signal represents allowable current value Imax (rated current). As long as allowable current value Imax (rated current) set beforehand of charging cable 200 is notified to controller 10 of vehicle VE, the pilot signal may take any form.

As also described above, a potential of the pilot signal is handled by controller 10 of on-vehicle charging device 100. For example, a potential of the pilot signal when charging cable 200 is not connected to on-vehicle charging device 100 is predetermined potential V1 (e.g., 12 V). When connector 22 of charging cable 200 is connected to connector 16 of on-vehicle charging device 100, a resistance circuit (not shown) of controller 10 of on-vehicle charging device 100 causes the potential of the pilot signal to lower to predetermined potential V2 (e.g., 9 V). In addition, when charging has been ready in on-vehicle charging device 100, controller 10 of on-vehicle charging device 100 causes the resistance circuit (not shown) to further operate to lower the potential of the pilot signal to predetermined potential V3 (e.g., 6 V).

Switch SW1 of charging cable 200 turns on/off a connection between on-vehicle charging device 100 and external power source 300, and is controlled by control pilot circuit 21. Control pilot circuit 21 detects the potential of the pilot signal with a potential sensor (not shown), and turns on switch SW1 when the detected potential is predetermined potential V3. Therefore, the alternating current power supplied from external power source 300 is supplied to on-vehicle charging device 100. Control pilot circuit 21 turns off switch SW1 when the detected potential of the pilot signal is other than predetermined potential V3. Therefore, only when charging cable 200 and on-vehicle charging device 100, and charging cable 200 and external power source 300 are respectively securely connected, and charging has been ready in on-vehicle charging device 100, on-vehicle charging device 100 and external power source 300 can be connected to each other.

Connector 22 connects charging cable 200 to on-vehicle charging device 100, and fits with connector 16 of on-vehicle charging device 100 described above.

Connector 23 connects charging cable 200 and external power source 300.

[External Power Source 300]

External power source 300 includes power source 31 and connector 32. Power source 31 is, for example, a commercial system power source, and is an alternating current power source with a voltage of 100 V or 200 V. Connector 32 is provided to external power source 300, and is configured to be able to fit with connector 23 of charging cable 200.

[Charging Operation of On-Vehicle Charging Device 100]

Figure 2:
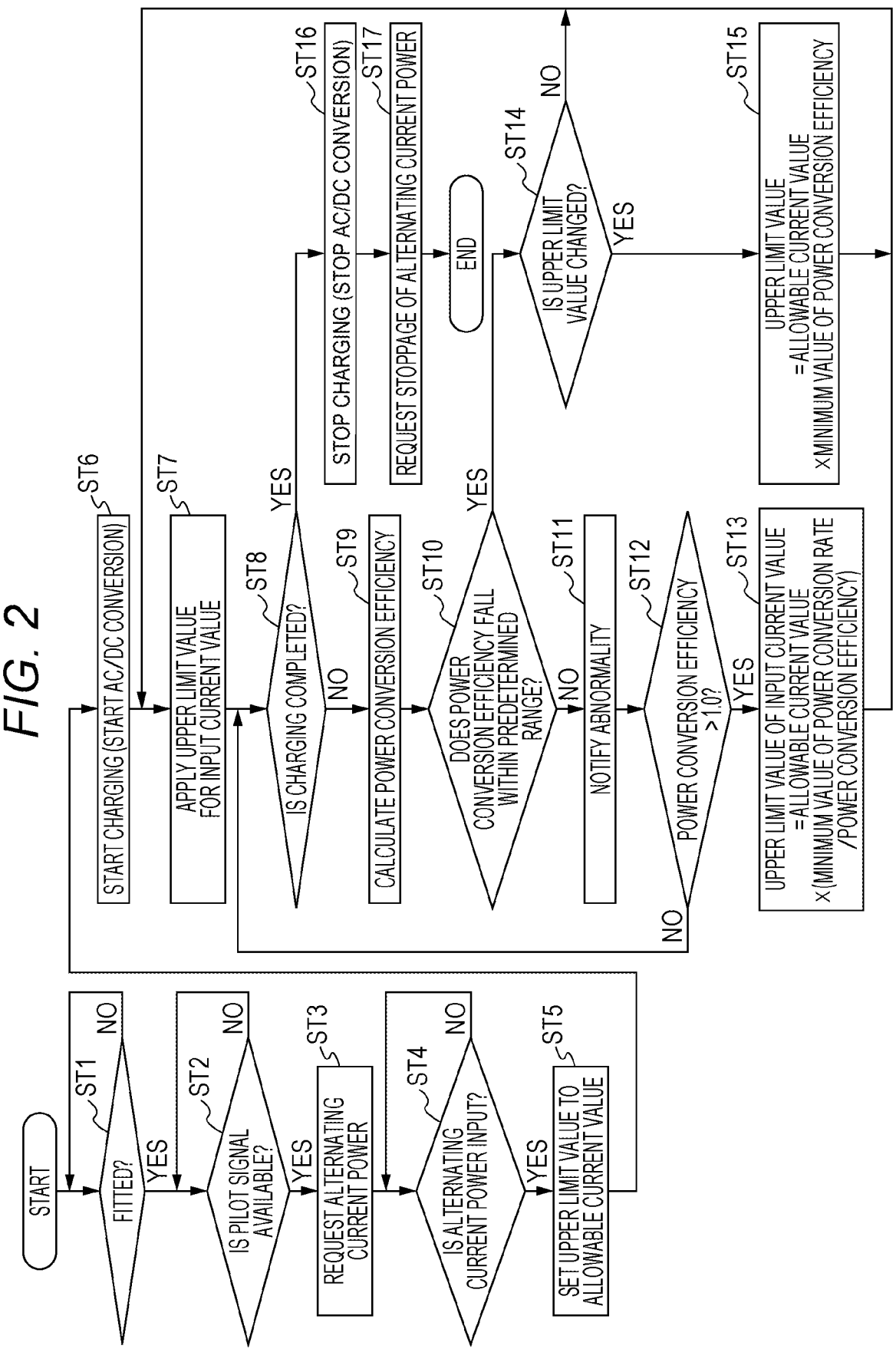
FIG. 2 is a flowchart for describing an example of an operation of a controller in a charging operation of the on-vehicle charging device shown in FIG. 1.

Next, a charging operation by on-vehicle charging device 100 will now be described in detail. FIG. 2 is a flowchart for describing an example of an operation of controller 10 in the charging operation of on-vehicle charging device 100. In the charging operation by on-vehicle charging device 100, controller 10 always monitors input current value AC_I detected by input current sensor 12, input voltage value AC_V detected by input voltage sensor 13, output current value DC_I detected by output current sensor 14, and output voltage value DC_V detected by output voltage sensor 15.

(Step ST1)

In step ST1, controller 10 determines whether or not controller 10 has received the fitting signal from connector 16. The fitting signal indicates that connector 22 of charging cable 200 is fitted to connector 16 of on-vehicle charging device 100. When controller 10 has not yet received the fitting signal, step ST1 is repeated, and, when controller 10 has received the fitting signal, the control proceeds to step ST2.

(Step ST2)

In step ST2, controller 10 determines whether or not controller 10 has received the pilot signal from control pilot circuit 21 of charging cable 200. When controller 10 has not yet received the pilot signal, step ST2 is repeated, and, when controller 10 has received the pilot signal, the control proceeds to step ST3.

(Step ST3)

In step ST3, controller 10 requests charging cable 200 to start supplying of alternating current power. Specifically, controller 10 causes the above described resistance circuit to operate so that the potential of the pilot signal received from charging cable 200 reaches predetermined potential V3. In response to this operation, control pilot circuit 21 of charging cable 200 turns on switch SW1. Accordingly, charging cable 200 connects external power source 300 to on-vehicle charging device 100, thus the alternating current power supplied from power source 31 of external power source 300 is input to on-vehicle charging device 100 via charging cable 200.

(Step ST4)

In step ST4, controller 10 determines whether or not the alternating current power supplied from external power source 300 is input. This determination may be made based on whether or not an input voltage value detected by input voltage sensor 13 is equal to or above a predetermined value. When the input voltage value detected by input voltage sensor 13 is below the predetermined value, step ST4 is repeated, and, when the input voltage value detected by input voltage sensor 13 is equal to or above the predetermined value, the control proceeds to step ST5.

(Step ST5)

In step ST5, controller 10 refers to the pilot signal received from control pilot circuit 21 of charging cable 200 to check information on allowable current value Imax of charging cable 200, and sets, to allowable current value Imax, upper limit value Ilim1 for an input current value to be supplied during charging, in other words, during a conversion operation of alternating current power into direct current power performed by power converter 11. Each time allowable current value Imax to be obtained from the pilot signal is changed during charging, controller 10 sets allowable current value Imax obtained newly to upper limit value Ilim1.

(Step ST6)

In step ST6, controller 10 causes power converter 11 to start a power conversion operation for converting the alternating current power input from external power source 300 into direct current power.

(Step ST7)

In step ST7, in the power conversion operation performed by power converter 11, controller 10 controls power converter 11 so that an input current value does not exceed upper limit value Ilim set in step ST5, upper limit value Ilim2 to be set in step ST13 described later, or upper limit value Ilim3 to be set in step ST15 described later.

(Step ST8)

In step ST8, controller 10 determines whether or not the charging operation has been completed. This determination may be made, for example, based on whether or not a state of charge (SOC, or a remaining electric charge in the battery) calculated by a battery monitor sensor (not shown) for high voltage battery 43 is equal to or above a predetermined value. When the SOC is equal to or above the predetermined value, controller 10 determines that the charging operation of on-vehicle charging device 100 has been completed. If not, controller 10 determines that the charging operation has not yet been completed. When controller 10 has determined, in step ST8, that the charging operation has been completed, the control proceeds to step ST16. If not, the control proceeds to step ST9.

(Step ST9)

In step ST9, controller 10 calculates power conversion efficiency 11 of power converter 11 based on input current value AC_I detected by input current sensor 12, input voltage value AC_V detected by input voltage sensor 13, output current value DC_I detected by output current sensor 14, and output voltage value DC_V detected by output voltage sensor 15. This calculation is performed by using, for example, equation (1) shown below.

$$\eta = \frac{DC\_V \times DC\_I}{AC\_V \times AC\_I} \tag{1}$$

(Step ST10)

In step ST10, controller 10 determines whether or not power conversion efficiency η calculated in step ST9 falls within a predetermined range. The predetermined range refers to, for example, a range from 0.8 to 1.0, exclusive. Power conversion efficiency of typical power converter 11 is approximately 0.9. Therefore, if power conversion efficiency η is below 0.8, controller 10 determines that the efficiency is too low, and thus an abnormality is occurring. Power conversion efficiency η exceeding 1.0 clearly indicates an abnormality. When power conversion efficiency η falls within the predetermined range, the control proceeds to step ST14. If not, the control proceeds to step ST11.

(Step ST11)

In step ST11, controller 10 notifies a higher vehicle controller (not shown) or a user of an abnormality being occurring. In this stage, controller 10 is not able to identify a portion where the abnormality is occurring. The possible portion where the abnormality is occurring is one of power converter 11, input current sensor 12, input voltage sensor 13, output current sensor 14, and output voltage sensor 15. Therefore, controller 10 causes, for example, an abnormal charging lamp (not shown) provided at a predetermined position of vehicle VE to turn on, to notify the user of the abnormality. The abnormal charging lamp is notification means for showing that a normal charging operation cannot be performed due to some reasons. The abnormal charging lamp does not notify of a location where the abnormality is occurring. The abnormal charging lamp may be provided, for example, on a meter panel, a center console, a dashboard, or another location in the vehicle.

(Step ST12)

In step ST12, controller 10 determines whether or not the determination made in step ST10 is abnormal power conversion efficiency η exceeding 1.0. According to equation (1), abnormal power conversion efficiency η exceeding 1.0 is caused by either a case when input current value AC_I or input voltage value AC_V is measured smaller than an actual value, or a case when output current value DC_I or output voltage value DC_V is measured greater than an actual value.

When input voltage value AC_V is measured smaller than an actual value, or when output current value DC_I or output voltage value DC_V is measured greater than an actual value, even though the value can be determined as an abnormality, an unfavorable event such as heating in charging cable 200 due to an excessive current would be less likely to occur. The reason thereof is as below. Input voltage value AC_V measured smaller than an actual value simply indicates that the measured value of the input voltage is erroneously measured, and therefore the value does not affect other portions, because input voltage value AC_V depends on a voltage of power source 31 of external power source 300, and thus is constant. When output current value DC_I or output voltage value DC_V is measured greater than an actual value, charging efficiency to high voltage battery 43 might lower from normal charging efficiency, but the unfavorable event such as heating due to the excessive current would be less likely to occur, because an actual output value is smaller than the measured value.

On the other hand, when input current value AC_I is measured smaller than an actual value, a current greater than the measured value would actually flow into charging cable 200. When an actually flowing current exceeds allowable current value Imax of charging cable 200, the unfavorable event such as heating would be likely to occur.

In view of the above described considerations, when abnormal power conversion efficiency η exceeding 1.0 arises, on-vehicle charging device 100 according to the present exemplary embodiment assumes and responds to a case when input current value AC_I is measured smaller than an actual value, which is the case of the highest risk. In other words, when abnormal power conversion efficiency η exceeding 1.0 arises, on-vehicle charging device 100 performs an operation for reducing an input current value. Details on the operation for reducing the input current value will be described later in step ST13.

In step ST12, when abnormal power conversion efficiency η exceeding 1.0 has been identified, the control proceeds to step ST13. If not, i.e., power conversion efficiency η is below 0.8, the control returns to step ST8. The reason why the control returns to step ST8 is as below. When power conversion efficiency η is below 0.8, and a cause of abnormality is an abnormality in the input current sensor, it can be determined that input current sensor 12 has measured input current value AC_I greater than an actual value. Therefore, as long as controller 10 performs a control so that a value measured by input current sensor 12 does not exceed the allowable current value, an actual input current does not exceed allowable current value Imax. When power conversion efficiency η is below 0.8, and the cause of abnormality is not the abnormality in input current sensor 12, it can be determined that input current sensor 12 operates normally, and thus, as long as controller 10 performs the control so that the value measured by input current sensor 12 does not exceed the allowable current value, an input current value does not exceed allowable current value Imax. Based on the above described considerations, when power conversion efficiency η is below 0.8, it can be determined that no risk will arise even when controller 10 continues charging, and thus controller 10 continues charging. The control returns to step ST8 for a determination of whether or not charging has been completed in step ST8.

(Step ST13)

In step ST13, controller 10 sets again an upper limit value for an input current value to upper limit value Ilim2 that is smaller than upper limit value Ilim1 set in step ST5. Upper limit value Ilim2 to be set again can be determined by following equation (2) shown below, for example.

$$I\lim2 = I\max \times \frac{\eta\min}{\eta} \quad (2)$$

In equation (2), ηmin represents a minimum effective efficiency value for power conversion efficiency, and is 0.8, for example. Herein, a value of power conversion efficiency η in exceeds 1.0. As described above, upper limit value Ilim2 can be determined with equation (2) that includes, as a variable, present power conversion efficiency η that is an abnormal value. Therefore, by applying upper limit value Ilim2 for input current value AC_I, controller 10 can control power converter 11 so that input current value AC_I reduces as power conversion efficiency η increases. After controller 10 newly sets an upper limit value to upper limit value Ilim2, the control returns to step ST7.

(Step ST14)

When power conversion efficiency η is determined to fall within the predetermined range in step ST10, controller 10 determines, in step ST14, whether or not the upper limit value has been changed from Ilim1 to Ilim2. A case when the upper limit value has been changed from Ilim1 to Ilim2 refers to a case where it is once determined that abnormal power conversion efficiency η exceeding 1.0 is occurring in step ST12, the upper limit value is set again in step ST13, and, back to step ST7, new upper limit value Ilim2 is applied. In other words, in step ST13, whether or not an abnormality has been detected at least once in a period from when charging starts (step ST6) to present is determined. When controller 10 determines that the upper limit value has been changed from Ilim1 to Ilim2, the control proceeds to step ST15. If not, the control returns to step ST7.

(Step ST15)

In step ST15, controller 10 sets the upper limit value for the input current value to upper limit value Ilim3 obtained with equation (3) shown below.

$$I\lim3 = I\max \times \eta\min \quad (3)$$

Step ST15 is executed when, after an abnormality has been detected at least once in a period from when charging starts to present in step ST14, power conversion efficiency η then again falls within a normal range, in other words, when, after upper limit value Ilim2 already set again in step ST13 is applied for the input current value, power conversion efficiency η then again falls within a range from 0.8 to 1.0, exclusive. Upper limit value Ilim3 obtained with equation (3) described above is greater than upper limit value Ilim2, but is smaller than the allowable current value. Even though power conversion efficiency η again falls within the normal range, since it has once been determined that an abnormality is occurring, setting again the upper limit value to Ilim3, instead of Ilim, allows the charging operation to safely continue while increasing an upper limit above upper limit value Ilim2.

(Step ST16)

In step ST16, when controller 10 has determined that the charging operation has been completed in step ST8, controller 10 stops the charging operation.

(Step ST17)

In step ST17, controller 10 requests charging cable 200 to stop supplying of alternating current power. Specifically, controller 10 causes the above described resistance circuit to stop its operation so that the potential of the pilot signal received from charging cable 200 does not reach predetermined potential V3. In response to this operation, control pilot circuit 21 of charging cable 200 turns off switch SW1. Therefore, charging cable 200 disconnects on-vehicle charging device 100 from external power source 300, and accordingly the alternating current power supplied from power source 31 of external power source 300 will no longer input to on-vehicle charging device 100.

As described above, on-vehicle charging device 100 according to the present exemplary embodiment includes controller 10 for controlling power converter 11 so that the input current value does not exceed allowable current value Imax. By detecting an abnormality in on-vehicle charging device 100 based on the input current, the input voltage, the output current, the output voltage, and power conversion efficiency η of power converter 11, controller 10 can always accept an input current near allowable current value Imax, and can increase output power as much as possible. Therefore, with on-vehicle charging device 100 according to the present exemplary embodiment, while a charging period for high voltage battery 43 is shortened, an excessive current exceeding allowable current value Imax can be prevented from flowing into charging cable 200 by appropriately diagnosing an abnormality.

When power conversion efficiency η exceeds 1.0, on-vehicle charging device 100 according to the present exemplary embodiment performs an operation for reducing an input current value for a safety purpose. Specifically, controller 10 performs a current control so that an input current value is equal to upper limit value Ilim2 obtained with above described equation (2). Applying upper limit value Ilim2 to an input current value can prevent an excessive current that would be likely to flow into charging cable 200 due to an abnormality in on-vehicle charging device 100 from flowing, and thus, even when charging continues after an abnormality has been detected, safety in a charging operation can be secured. Therefore, even when an abnormality has been detected, on-vehicle charging device 100 can continue charging by reducing an input current value so that the input current value does not exceed allowable current value Imax of charging cable 200. Therefore, an unfavorable event can be avoided, where an abnormality is detected, charging stops, and a battery is not fully charged even when a charging completion period ends.

Even when no abnormality is determined after an abnormality has once been detected (YES in step ST14), since controller 10 applies, for the input current value, upper limit value Ilim3 that is greater than upper limit value Ilim2, but is smaller than allowable current value Imax, the charging operation can further safely be continued.

<<Modifications>>

In on-vehicle charging device 100 according to the above described exemplary embodiment, controller 10 performs a control so that the input current value is equal to upper limit value Ilim2 calculated from power conversion efficiency and an allowable current value, as an operation for reducing the input current value when power conversion efficiency $\eta$ exceeds 1.0. However, a method of determining an upper limit value in an operation for reducing an input current value when power conversion efficiency $\eta$ exceeds 1.0 is not limited to the above described method, but another method may be used. Other exemplary methods will now be described herein.

<First Modification>

Figure 3:
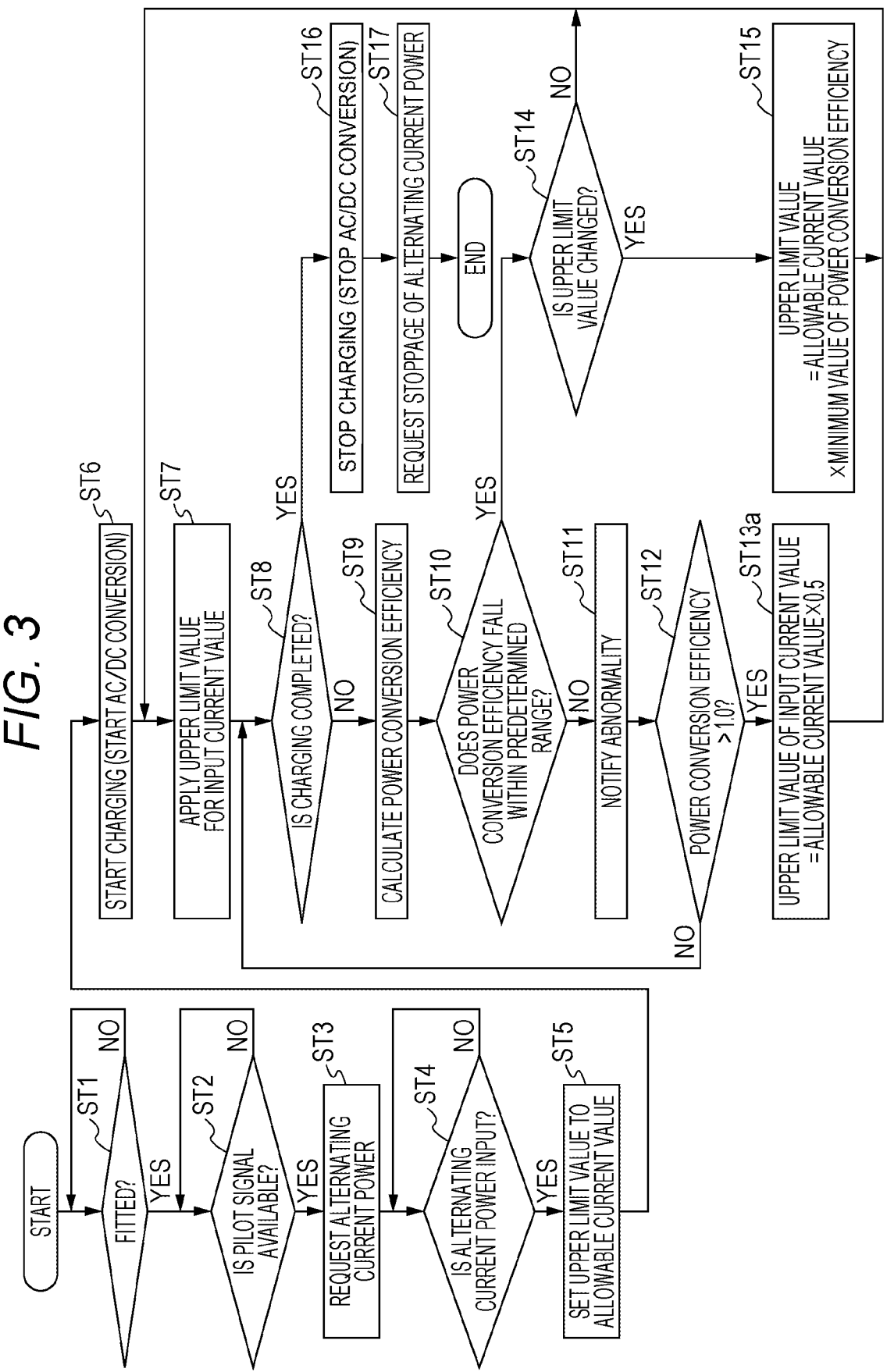
FIG. 3 is a flowchart illustrating a first modification to the operation of the controller in the charging operation of the on-vehicle charging device shown in FIG. 1.

FIG. 3 is a flowchart illustrating a first modification to the operation of controller 10 in the charging operation of on-vehicle charging device 100 according to the present exemplary embodiment. The flowchart shown in FIG. 3 is identical to the flowchart shown in FIG. 2, excluding step ST13a for setting again an upper limit value. Therefore, descriptions for operations in steps other than step ST13a are omitted, and an operation of step ST13a will now be described herein.

(Step ST13a)

In step ST13a, controller 10 sets again an upper limit value for an input current value to upper limit value Ilim4 that is smaller than upper limit value Ilim1 set in step ST5. Upper limit value Ilim4 to be set again can be determined by following equation (4) shown below, for example.

$$Ilim4 = Imax \times 0.5 \quad (4)$$

In other words, in the first modification, controller 10 sets an upper limit value to a value that is half of allowable current value Imax. After this step, in step ST7, controller 10 applies upper limit value Ilim4 for the input current value. Therefore, upper limit value Ilim4 that is remarkably smaller than allowable current value Imax is applied for the input current value. Accordingly, even when an abnormality arises in input current sensor 12, and an actual input current is greater than a value measured by input current sensor 12, an input current value after Ilim4 is applied does not exceed allowable current value Imax, and thus safety in a charging operation can be secured.

<Second Modification>

Figure 4:
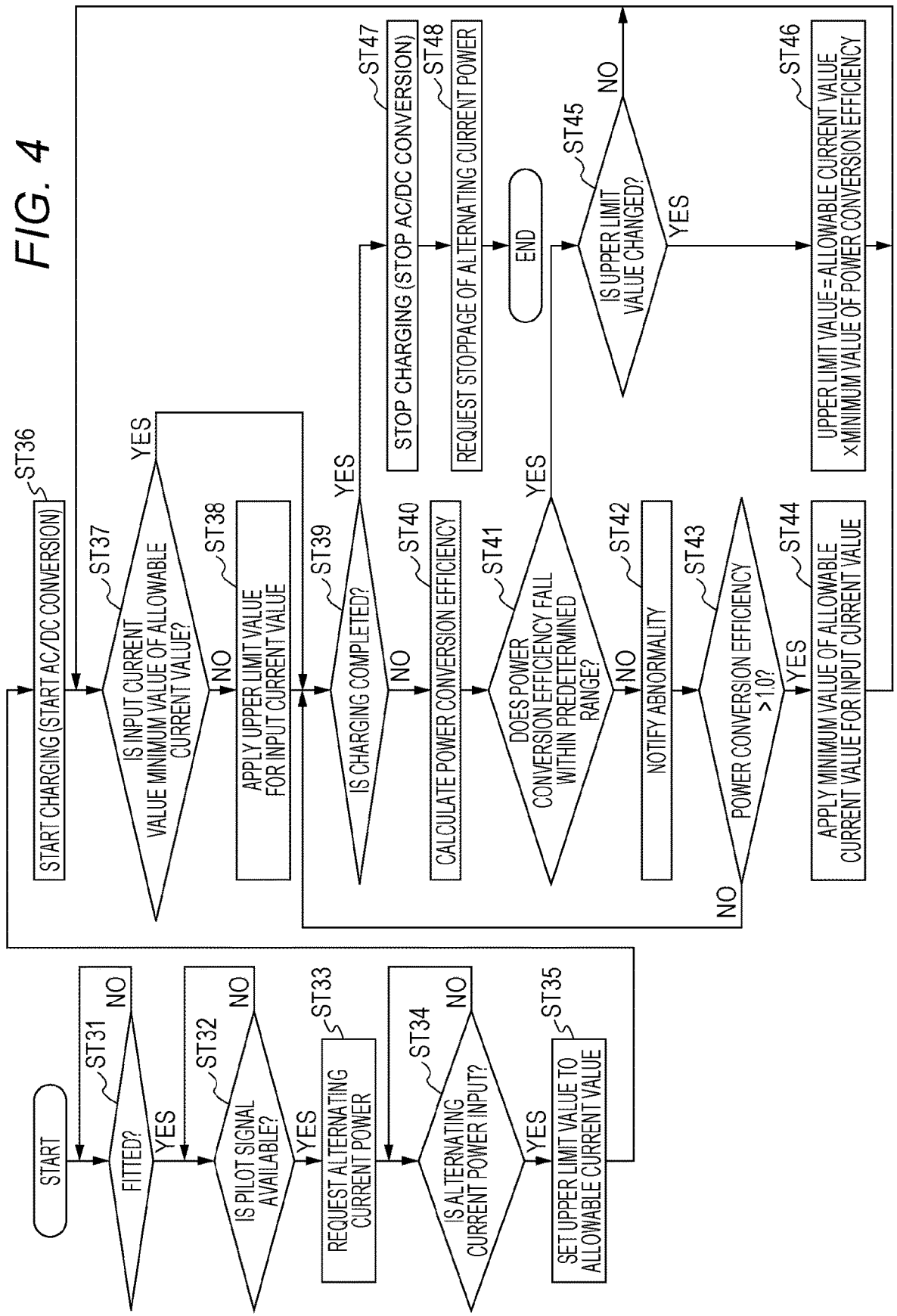
FIG. 4 is a flowchart illustrating a second modification to the operation of the controller in the charging operation of the on-vehicle charging device shown in FIG. 1.

FIG. 4 is a flowchart illustrating a second modification to the operation of controller 10 in the charging operation of on-vehicle charging device 100 according to the present exemplary embodiment.

(Step ST31)

In step ST31, controller 10 determines whether or not controller 10 has received the fitting signal indicating that connector 22 of charging cable 200 is fitted to connector 16 of on-vehicle charging device 100 from connector 16. When controller 10 has not yet received the fitting signal, step ST31 is repeated, and, when controller 10 has received the fitting signal, the control proceeds to step ST32.

(Step ST32)

In step ST32, controller 10 determines whether or not controller 10 has received the pilot signal from control pilot circuit 21 of charging cable 200. When controller 10 has not yet received the pilot signal, step ST32 is repeated, and, when controller 10 has received the pilot signal, the control proceeds to step ST33.

(Step ST33)

In step ST33, controller 10 requests charging cable 200 to start supplying of alternating current power. Specifically, controller 10 causes the above described resistance circuit to operate so that the potential of the pilot signal received from charging cable 200 reaches predetermined potential V3. In response to this operation, control pilot circuit 21 of charging cable 200 turns on switch SW1. Accordingly, charging cable 200 connects external power source 300 to on-vehicle charging device 100, thus the alternating current power supplied from power source 31 of external power source 300 is input to on-vehicle charging device 100 via charging cable 200.

(Step ST34)

In step ST34, controller 10 determines whether or not the alternating current power supplied from external power source 300 is input. This determination may be made based on whether or not an input voltage value detected by input voltage sensor 13 is equal to or above a predetermined value. When the input voltage value detected by input voltage sensor 13 is below the predetermined value, step ST34 is repeated, and, when the input voltage value detected by input voltage sensor 13 is equal to or above the predetermined value, the control proceeds to step ST35.

(Step ST35)

In step ST35, controller 10 refers to the pilot signal received from control pilot circuit 21 of charging cable 200 to check information on allowable current value Imax of charging cable 200, and sets, to allowable current value Imax, upper limit value Ilim1 for an input current value to be supplied during charging, in other words, during a conversion operation of alternating current power into direct current power performed by power converter 11. Each time allowable current value Imax to be obtained from the pilot signal is changed during charging, controller 10 sets allowable current value Imax obtained newly to upper limit value Ilim1.

(Step ST36)

In step ST36, controller 10 causes power converter 11 to start a power conversion operation for converting the alternating current power input from external power source 300 into direct current power.

(Step ST37)

In step ST37, controller 10 determines whether or not a present input current value is set to minimum value Imin, instead of an upper limit value. Minimum value Imin will be described later in step ST44. When controller 10 determines that the present input current value is set to minimum value Imin, the control proceeds to step ST39. If not, the control proceeds to step ST38. When controller 10 determines that the present input current value is set to minimum value Imin, controller 10 controls power converter 11 so that an input current value is equal to minimum value Imin.

(Step ST38)

In step ST38, in the power conversion operation performed by power converter 11, controller 10 controls power converter 11 so that the input current value is equal to upper limit value Ilim1 set in step ST35, or upper limit value Ilim3 to be set in step ST46 described later.

(Step ST39)

In step ST39, controller 10 determines whether or not the charging operation has been completed. This determination may be made based on, for example, whether or not an SOC (remaining electric charge in the battery) of high voltage battery 43 is equal to the predetermined value or higher. When the SOC is equal to or above the predetermined value, controller 10 determines that the charging operation of on-vehicle charging device 100 has been completed. If not, controller 10 determines that the charging operation has not yet been completed. When controller 10 has determined, in step ST39, that the charging operation has been completed, the control proceeds to step ST47. If not, the control proceeds to step ST40.

(Step ST40)

In step ST40, controller 10 calculates power conversion efficiency η of power converter 11 based on input current value AC_I detected by input current sensor 12, input voltage value AC_V detected by input voltage sensor 13, output current value DC_I detected by output current sensor 14, and output voltage value DC_V detected by output voltage sensor 15. This calculation may be made using equation (1) described in step ST9 in the flowchart shown in FIG. 2.

(Step ST41)

In step ST41, controller 10 determines whether or not power conversion efficiency η calculated in step ST39 falls within a predetermined range, for example, a range from 0.8 to 1.0, exclusive. When power conversion efficiency η falls within the predetermined range, the control proceeds to step ST45. If not, the control proceeds to step ST42.

(Step ST42)

In step ST42, controller 10 notifies a user of an abnormality being occurring using the abnormal charging lamp or a similar device.

(Step ST43)

In step ST43, controller 10 determines whether or not power conversion efficiency η determined in step ST41 is abnormal, namely exceeds 1.0. When the abnormality is occurring where power conversion efficiency η exceeds 1.0, the control proceeds to step ST44. If not, the control returns to step ST39.

(Step ST44)

In step ST44, controller 10 sets an input current value to minimum value Imin that is smaller than upper limit value Ilim1 set in step ST35. Minimum value Imin is a minimum value of allowable current value Imax of charging cable 200 (there is no allowable current value Imax below minimum value Imin). In other words, the control in which the input current value is set to minimum value Imin allows an unfavorable event to be securely avoided. Specifically, an excessive current does not flow in charging cable 200 during a charging operation.

(Step ST45)

When power conversion efficiency η is determined to fall within the predetermined range in step ST41, controller 10 determines whether or not the input current value has been changed from upper limit value Ilim1 to minimum value Imin in step ST45. In other words, in step ST45, it is determined whether or not an abnormality has been detected at least once in a period from when charging starts (step ST36) to present. When controller 10 determines that an input current value has been changed, the control proceeds to step ST46. If not, the control returns to step ST37.

(Step ST46)

In step ST46, controller 10 sets an upper limit value for the input current value to upper limit value Ilim3 obtained with equation (3) described above.

(Step ST47)

In step ST47, when controller 10 has determined that the charging operation has been completed in step ST39, controller 10 stops the charging operation.

(Step ST48)

In step ST48, controller 10 requests charging cable 200 to stop supplying of alternating current power.

As described above in the second modification, when an abnormality has been detected, controller 10 performs a control so that the input current value is equal to minimum value Imin. Therefore, an unfavorable event can securely be avoided, where a current flowing into charging cable 200 during the charging operation performed by on-vehicle charging device 100 becomes an excessive current.

The on-vehicle charging device according to the second modification performs a control so that the input current value is equal to minimum value Imin when an abnormality has been detected. However, since the abnormality might be present in input current sensor 12, an output control should advantageously be performed, by calculating output power so that the input current value reaches minimum value Imin, and the output power conforming to a result of the calculation is attained, instead of an output control based on a value measured by input current sensor 12.

Specifically, output power is specified to a value obtained by multiplying a minimum voltage value (e.g., 100 V) of power source 31, minimum value Imin (e.g., 6 A) of allowable current value Imax, and a minimum value (e.g., 80%) of conversion efficiency. By controlling output power as described above, the input current value can be kept to a value equal to or less than minimum value Imin.

In addition, when an abnormality has been detected after a normal operation was determined (No in step ST45), output power may be specified to a value obtained by multiplying an input voltage value detected during the normal operation, minimum value Imin (e.g., 6 A) of allowable current value Imax, and a minimum value (e.g., 80%) of conversion efficiency.

A control may be performed, in which smaller one is adopted among the output power calculated based on a value measured by input current sensor 12 so that the input current value is equal to minimum value Imin, and the output power calculated as described above.

As described above, on-vehicle charging device 100 according to the present exemplary embodiment includes power converter 11, input current sensor 12, input voltage sensor 13, output current sensor 14, output voltage sensor 15, and controller 10. Power converter 11 converts alternating current power into direct current power. Input current sensor 12 detects an input current of alternating current power supplied from external power source 300 that is an alternating current power source, and input voltage sensor 13 detects an input voltage supplied from external power source 300. Output current sensor 14 detects an output current from power converter 11, and output voltage sensor 15 detects an output voltage from power converter 11. Controller 10 obtains an allowable current value of alternating current power that can be accepted from external power source 300, and, based on an input current value detected by input current sensor 12, controls power converter 11 so that the input current value does not exceed the allowable current value. Controller 10 also detects an abnormality in on-vehicle charging device 100 based on the input current, the input voltage, the output current, the output voltage, and the power conversion efficiency of power converter 11.

Therefore, while shortening a charging period, even when an abnormality arises in the input current sensor, the abnormality can be detected, and a current control can be performed so that the input current value does not exceed the allowable current value.

On-vehicle charging device 100 according to the present exemplary embodiment calculates actual power conversion efficiency η based on input power based on input current value AC_I and input voltage value AC_V, and output power based on output current value DC_I and output voltage value DC_V, and detects the abnormality based on whether or not power conversion efficiency η falls within a predetermined range. Therefore, an abnormality in on-vehicle charging device 100 can be detected easily and securely.

When calculated actual power conversion efficiency η is greater than the predetermined power conversion efficiency, for example, 1.0 that is a maximum value of efficiency (1.0<η), controller 10 determines that an abnormality is occurring in on-vehicle charging device 100, and controls power converter 11 so that power supplied to high voltage battery 43 is lowered. When calculated actual power conversion efficiency η is smaller than the predetermined power conversion efficiency, for example, a value of efficiency (e.g., 0.8) that is smaller than a value of efficiency in a normal operation (approximately 0.9) (η<0.8), power higher than power supplied when 1.0<η is satisfied is supplied to high voltage battery 43.

Therefore, even if an abnormality has been detected in on-vehicle charging device 100, high voltage battery 43 can be kept charged even with smaller power than power supplied during a normal operation. Therefore, an unfavorable event can be avoided, where an abnormality has been detected in the on-vehicle charging device, and thus charging has been stopped and charging is not performed at all even when a scheduled charging completion time ends because of the abnormality detected during charging.

With on-vehicle charging device 100 according to the present exemplary embodiment, when calculated actual power conversion efficiency η is greater than 1.0 that is a maximum value of efficiency (1.0<η), controller 10 determines upper limit value Ilim2 using equation (2) described above, and applies upper limit value Ilim2 for input current value AC_I to control power converter 11, so that an input current value reduces as actual power conversion efficiency η increases.

On-vehicle charging device 100 according to the present exemplary embodiment described above is merely an example of the present invention. The present invention is not limited to this example. In addition to the above described exemplary embodiment, the present invention can take various modifications.

For example, in the above described exemplary embodiment, power conversion efficiency η that is a ratio between a multiplication of input current value AC_I and input voltage value AC_V, i.e., input power, and a multiplication of output current value DC_I and output voltage value DC_V, i.e., output power, is used to determine whether or not an abnormality is occurring in on-vehicle charging device 100.

However, the present invention is not limited to this method. For example, by specifying power conversion efficiency η0 beforehand, and by comparing a multiplication of input power to sequentially be measured and specified power conversion efficiency η0 with output power to sequentially be measured, an abnormality may be determined when the multiplication of the input power and specified power conversion efficiency η0 differs from the output power, or the multiplication is outside of a predetermined range around the output power as a center value. In contrast, whether or not an abnormality is occurring may be determined by calculating mathematical input power using output power to sequentially be measured and specified power conversion efficiency η0, and by comparing input power to sequentially be measured and the calculated input power.

In addition, for example, by specifying power conversion efficiency η0 beforehand, and by calculating a difference between predetermined power conversion efficiency η0 and actual power conversion efficiency η based on input current value AC_I, input voltage value AC_V, output current value DC_I, and output voltage value DC_V, an abnormality may be determined when the difference is equal to or above a predetermined value.

In the above described exemplary embodiment, in order to avoid an unfavorable event where charging is not performed at all if an abnormality is occurring, a control is performed so that an input current value (and accordingly output power) is lowered. However, a control where supplying power is stopped if an abnormality is occurring may be performed in considerations of safety.

A control may be performed, where supplying of power is stopped when calculated actual power conversion efficiency η is greater (1.0<η), while an input current is reduced when calculated actual power conversion efficiency η is smaller (η<0.8). When power conversion efficiency η falls outside of the predetermined range (e.g., 0.8<η<1.0), a battery may be supplied with power at upper limit value Ilim2, upper limit value Ilim3, or a minimum allowable current value, regardless of whether power conversion efficiency η is greater or smaller.

INDUSTRIAL APPLICABILITY

The present invention is advantageously applicable to a power conversion device for an on-vehicle charging device for performing normal charging to an electrically driven vehicle.

REFERENCE MARKS IN THE DRAWINGS 100 on-vehicle charging device
10 controller
11 power converter
12 input current sensor
13 input voltage sensor
14 output current sensor
15 output voltage sensor
16 connector
21 control pilot circuit
22, 23, 32 connector
31 power source
41, 42 main relay
43 high voltage battery
44 low voltage battery
200 charging cable
300 external power source The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power conversion device for converting alternating current power into direct current power to supply the direct current power to a load, the power conversion device comprising:
    an input current sensor configured to detect an input current value of the alternating current power;
    an input voltage sensor configured to detect an input voltage value of the alternating current power;
    a power converter configured to convert the input alternating current power into the direct current power;
    an output current sensor configured to detect an output current value from the power converter;
    an output voltage sensor configured to detect an output voltage value from the power converter; and
    a controller configured to:
        obtain an allowable current value of the alternating current power that can be accepted,
        control the power converter so that the input current value does not exceed the allowable current value, based on the input current value detected by the input current sensor,
        calculate a power conversion efficiency of the power converter based on the input current value, the input voltage value, the output current value, and the output voltage value,
        compare the calculated power conversion efficiency with a predetermined power conversion efficiency,
        determine that an abnormality exists in the power conversion device upon detecting that the calculated power conversion efficiency is greater than the predetermined power conversion efficiency,
        upon determining that the abnormality exists in the power conversion device, control turning on and off of a switching element included in the power converter so that the input current value reduces as the calculated power conversion efficiency increases, and
        set an upper limit value of the input current value that is smaller than the allowable current value so that the input current value reduces as the calculated power conversion efficiency increases.

2. The power conversion device according to claim 1, wherein the controller is further configured to obtain the allowable current value based on a pilot signal supplied together with the alternating current power.

3. The power conversion device according to claim 1, wherein the controller is further configured to control the power converter to lower power supplied to the load upon determining that the abnormality exists in the power conversion device.

4. The power conversion device according to claim 1, wherein, upon detecting that the calculated power conversion efficiency is smaller than the predetermined power conversion efficiency, the controller is further configured to control the power converter to supply greater power to the load than power supplied when the calculated power conversion efficiency is greater than the predetermined power conversion efficiency.

5. A power conversion device for converting alternating current power into direct current power to supply the direct current power to a load, the power conversion device comprising:
    an input current sensor configured to detect an input current value of the alternating current power;
    an input voltage sensor configured to detect an input voltage value of the alternating current power;
    a power converter configured to convert the input alternating current power into the direct current power;
    an output current sensor configured to detect an output current value from the power converter;
    an output voltage sensor configured to detect an output voltage value from the power converter; and
    a controller configured to:
        obtain an allowable current value of the alternating current power that can be accepted,
        control the power converter so that the input current value does not exceed the allowable current value, based on the input current value detected by the input current sensor,
        calculate a power conversion efficiency of the power converter based on the input current value, the input voltage value, the output current value, and the output voltage value,
        compare the calculated power conversion efficiency with a predetermined power conversion efficiency,
        determine that an abnormality exists in the power conversion device upon detecting that the calculated power conversion efficiency is greater than the predetermined power conversion efficiency,
        upon determining that the abnormality exists in the power conversion device, control turning on and off a switching element included in the power converter so that the input current value reduces as the calculated power conversion efficiency increases, and
        upon determining that the abnormality exists in the power conversion device, set an upper limit value of the input current value to reduce the input current value as the calculated power conversion efficiency increases, the upper limit value being smaller than the allowable current value.

6. The power conversion device according to claim 5, wherein the controller is further configured to obtain the allowable current value based on a pilot signal supplied together with the alternating current power.

7. The power conversion device according to claim 5, wherein the controller is further configured to control the power converter to lower power supplied to the load upon determining that the abnormality exists in the power conversion device.

8. The power conversion device according to claim 5, wherein, upon detecting that the calculated power conversion efficiency is smaller than the predetermined power conversion efficiency, the controller is further configured to control the power converter to supply greater power to the load than power supplied when the calculated power conversion efficiency is greater than the predetermined power conversion efficiency.

* * * * *